United States Patent Office 3,402,333
Patented Sept. 17, 1968

3,402,333
ELECTRONICALLY CONTROLLED SYNCHRONOUS MOTOR
Paul F. Hayner, Lexington, Mass., and John L. Mason, Nashua, N.H., assignors to Sanders Associates Inc., Nashua, N.H., a corporation of Delaware
Continuation of application Ser. No. 450,979, Apr. 26, 1965. This application Sept. 8, 1967, Ser. No. 666,519
13 Claims. (Cl. 318—138)

ABSTRACT OF THE DISCLOSURE

Apparatus is herein disclosed for a synchronous motor system in which the synchronous motor and its power supply are connected in a feedback loop such that the frequency of the power supply depends upon the motor speed and vice versa. The synchronous motor system includes a generator winding which develops an AC voltage by passing through the motor field during rotation, the induced signal being proportional to motor speed. The signal is amplified and applied to the armature winding of the motor to slightly accelerate the motor. The motor speed continues to accelerate accordingly. The system also includes a speed sensing unit within the power supply to limit armature current and thus maintain the motor at the desired operating speed.

---

Figure 1:
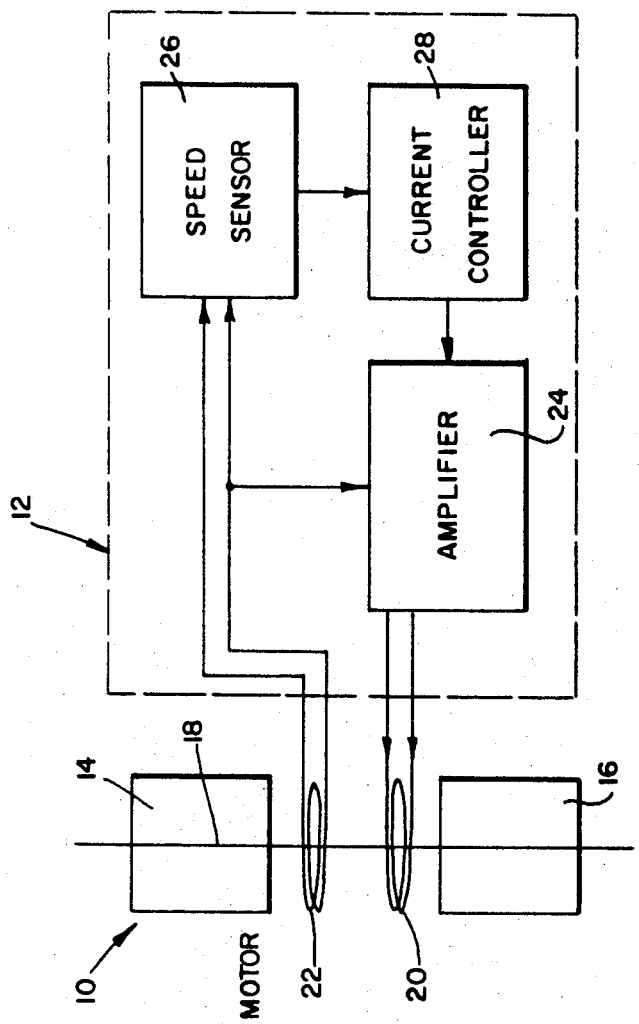

This application is a continuation of Ser. No. 450,979, filed Apr. 26, 1965, now abandoned.

This invention relates to a synchronous motor system and a power supply therefor. More particularly, it relates to a system in which a synchronous motor and its power supply are connected in a feedback loop so that the frequency of the power supply depends on the motor speed and the motor speed, in turn, depends on the power supply frequency. This results in a boot-strap type of operation in which the motor is accelerated to its operating speed in synchronism with an increase in the frequency of the power supply.

Synchronous motors of the type with which the present invention is particularly concerned are useful as substitutes for direct current motors, which require a brush-commutator arrangement for their operation. The brushes are a source of wear and furthermore, in low power applications, e.g. magnetic tape drives, their drag has a substantial adverse effect on efficiency and constancy of speed. In a synchronous motor the commutation is performed by the alternations of the current supplied to the motor and the use of brushes can be eliminated altogether by employing an inverted arrangement in which the armature windings are stationary and the rotating portion of the motor is a structure containing the field magnets. A construction of this type is disclosed in the copending application of Paul F. Hayner et al., for Printed Circuit Motor, Ser. No. 450,843 filed Apr. 26, 1965.

Motors for which the present system is designed have little or no starting torque when supplied with power at a frequency corresponding to the desired operating speed. This means that the motor must be brought up to speed by either one of two means. Specifically, either its speed must be increased mechanically to the point of synchronism with the supply frequency, or the power supply for the motor must be provided with a low initial frequency which is gradually increased to the operating level, with the motor speed increasing in synchronism therewith.

Accordingly, a principal object of the present invention is to provide a synchronous motor system employing a motor having little or no starting torque when supplied with power corresponding to the ultimate operating speed and yet capable of accelerating the motor to the operating speed from a relatively low initial speed.

Another object of the invention is to provide a system of the above type capable of operation from a direct-current electrical source.

Another object of the invention is to provide a system of the above type employing a single-phase, brushless motor.

A further object of the invention is to provide a system of the above type characterized by stability of motor speed.

Yet another object of the invention is to provide a system of the above size characterized by efficiency, small size, and light weight.

A still further object of the invention is to provide a power supply capable of efficiently powering a synchronous motor in a system of the above type.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Figure 2:
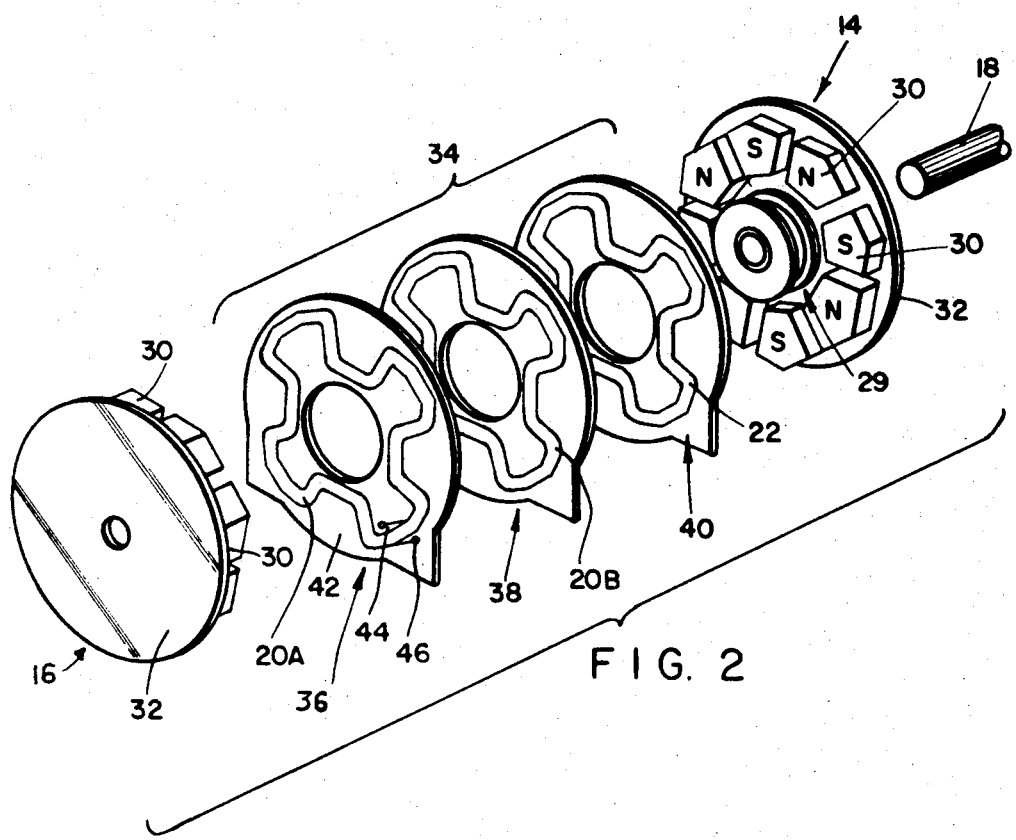
Figure 3:
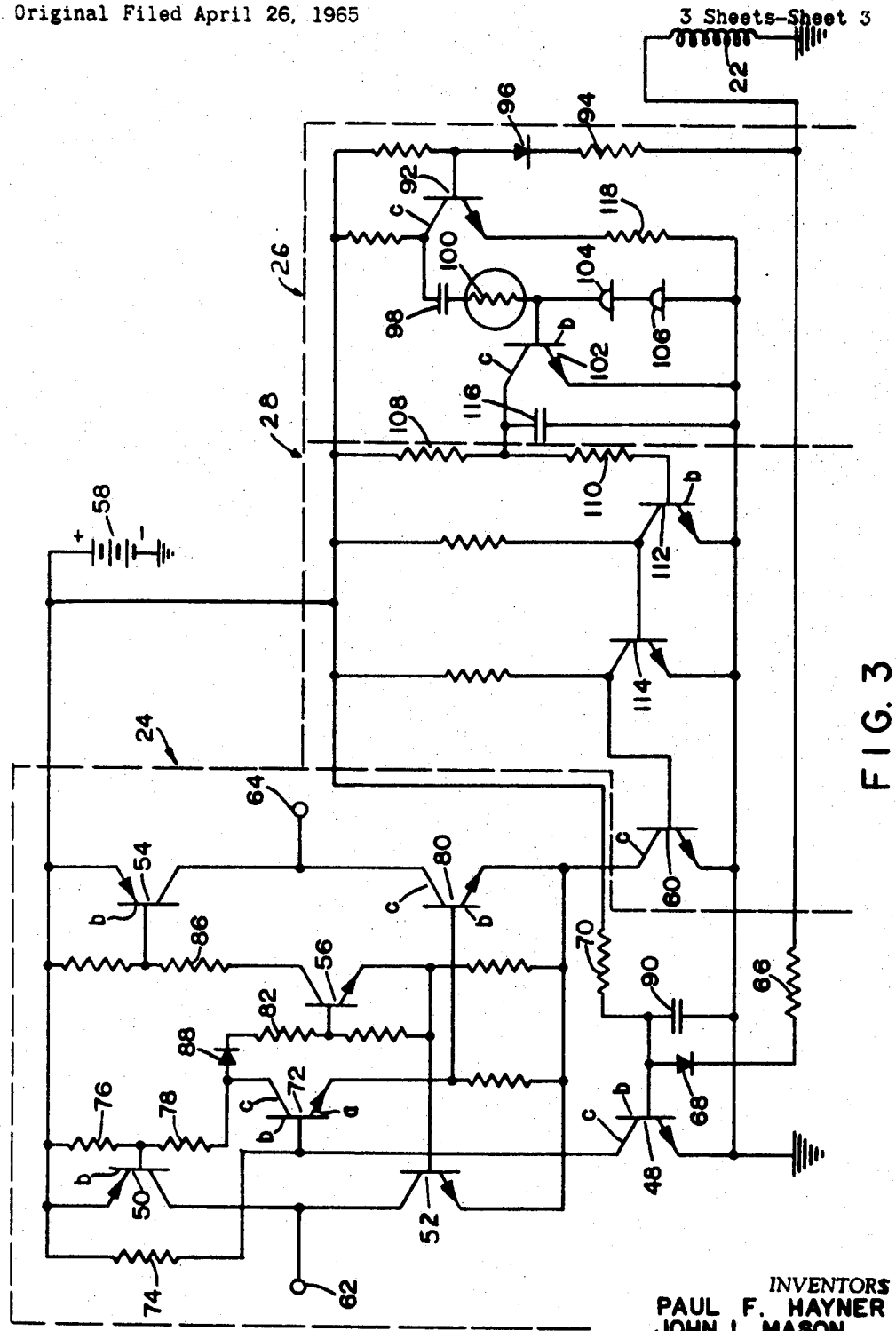

For a fuller understanding of the nature and objects of the invention, reference should be had to the following detailed description taken in connection with the accompanying drawing, in which:

FIG. 1 is a simplified schematic diagram of a synchronous motor system incorporating the invention, FIG. 2 is an exploded view of a synchronous motor which may be incorporated in the system, and FIG. 3 is a schematic diagram of the power supply incorporated in the system of FIG. 1.

In general, the present invention make uses of a synchronous motor having an armature winding supplied with alternating current to interact in a conventional manner with the unidirectional fields provided by a set of field magnets. In addition to the armature winding, the armature includes a generator winding which develops an alternating voltage by passing through the motor field during rotation of the motor. This induced signal has a frequency and magnitude which are both proportional to motor speed.

The power supply receives the signal from the generator winding, amplifies it and applies the resulting signal to the armature winding. Assuming that operation begins at a small but finite motor speed, so that the generator winding provides an initial output signal, the corresponding current supplied to the armature then accelerates the motor slightly. The frequency of the induced signal is thus increased, as is the frequency of the armature current. The motor thus continues to accelerate and this closed loop action promptly brings it up to the desired operating speed.

When the operating speed is reached, a speed sensing unit in the power supply develops a signal which is used to limit the armature current, thereby accurately holding the motor at this speed.

More specifically, as shown in FIG. 1, the system includes a motor generally indicated at 10 powered by a power supply 12. The motor 10 is preferably a synchronous motor having rotating field magnets and a stationary armature. The field magnets are carried on field units 14 and 16 mounted for rotation on a shaft 18 and arranged to direct an axial magnetic field through a stationary armature winding 20 and a generator winding 22. Rotation of the field units 14 and 16 induces a signal in the generator winding 22 which is amplified by an amplifier 24 in the power supply and then reapplied to the armature winding 20 to power the motor.

The motor is given a small initial velocity, either manually or by means of a suitable spring mechanism or the like (not shown) and this induces the initial signal from the generator winding 22. Amplification of this signal and the resultant powering of the motor through the armature winding 20 increases the speed of the motor and thereby increases the frequency of the signal from the winding 22. As described above, this results in a further increase in the frequency of the current supplied to the winding 20 with a consequent increase in motor speed.

When the motor reaches a desired operating speed, a speed sensor 26 in the power supply 12 emits a signal to a current controller 28 and the controller reduces the current supplied by the amplifier 24 to the winding 20. This, in turn, reduces the torque developed in the motor to the point where it is just sufficient to overcome the reaction torque of the motor load, and acceleration of the motor thus ceases.

A brushless, synchronous motor which may be advantageously incorporated in the system described herein is shown in FIG. 2. The field units 14 and 16 are secured to a hub assembly 29 which is mounted for rotation on the shaft 18. Each of the field units comprises a plurality of pole pieces 30 projecting from a plate 32 of a suitable high reluctance magnetic material such as iron. The pole pieces, which extend inwardly, parallel to the motor axis, are permanent magnets and thus they provide the fixed field of the motor. As indicated in the drawing, the corresponding pole pieces of the field units 14 and 16 are polarized in the same direction.

A stationary armature assembly generally indicated at 34 comprises cards 36 and 38, on which the armature winding is formed, and a card 40 carrying the generator winding 22. Each card comprises a substrate 42 with a sheet of copper foil (not shown) originally bonded thereto. The foil is etched away to form a winding whose shape and width correspond to the spaces surrounding the individual pole pieces 30. On the card 36 a winding section 20A comprises a conductor which begins at a terminal 44 and then proceeds around the card in zig-zag fashion for a plurality of complete revolutions until it finally terminates at a terminal 46. Each revolution of the conductor around the card provides a winding length of about three-quarters of a turn around each pole, with this figure multiplied by the number of such revolutions on each card, and the total number of cards to provide the total number of turns for each pole. The winding section 20A on the card 36 and a similar winding section 20B on the card 38 are connected in series to form the armature winding 20 of FIG. 1.

A motor of the above type is described in detail in the aforementioned copending application of Paul F. Hayner et al., for Printed Circuit Motor, U.S. Ser. No. 450,843, filed Apr. 26, 1965.

It will be apparent that as the shaft 18 and the field units 14 and 16 thereon rotate, an alternating electromotive force is induced in the generator winding 22, with both the frequency and amplitude of this signal being proportional to the speed of rotation. With the particular motor configuration illustrated in FIG. 2, the signal has a trapezoidal waveform, although this is not essential to the operation of the present invention.

As shown in FIG. 3, the amplifier 24 of the power supply includes a transistor 48 which receives the signal from the generator winding 22. In response to this signal, the transistor 48 drives a bridge circuit comprising transistors 50, 52, 54 and 56. The collector-emitter current paths of the transistors 50 and 52 are in series between a battery 58 and a transistor 60 in the current controller 28. Similarly, the transistors 54 and 56 are connected in series between the battery and the transistor 60. The armature winding 20 is connected to terminals 62 and 64 between the transistors 50 and 52, and 54 and 56, respectively.

The circuit is arranged so that during one half of each cycle of the signal from the generator winding 22, the transistors 50 and 56 conduct, while the transistors 52 and 54 are cut off. Current from the battery 58 then passes through the transistor 50, out the terminal 62, through the armature winding 20, into the terminal 64, and through the transistors 56 and 60 to ground. During the other half of each cycle, the transistors 54 and 62 conduct and the transistors 50 and 56 are cut off. Accordingly, the battery current passes through the transistor 54, out the terminal 64, through the winding 20, back into the terminal 62, and through the transistors 52 and 60 to ground. Thus, the direction of the current in the winding 20 reverses in accordance with the polarity reversals of the signal developed by the generator winding 22.

More specifically, the transistor 48 is connected in the common emitter configuration, with the signal from the winding 22 being applied to the base 48b by way of a resistor 66 and a diode 68. A bias voltage is derived by means of a resistor 70 connected between the battery 58 and the base 48b. The direction of conduction of the diode 68 is opposite to that of the base-emitter junction of the transistor 48 and thus the diode provides the input circuit with a voltage cancelling out the base-emitter voltage of the transistor. This, in turn, causes the transistor to switch between its conducting and nonconducting states when the voltage from the generator winding 22 passes through zero, thereby providing a symmetrical waveform for the output of the transistor 48 and, in turn, for the current applied to the armature winding 20.

The collector 48c of the transistor 48 is connected to the base 72b of a transistor 72. When the transistor 48 is cut off, base-emitter current flows in the transistor 72 by way of a load resistor 74, thereby causing collector-emitter conduction in the transistor 72. This latter current passes through a voltage divider, comprising resistors 76 and 78, on which the base 50b of the transistor 50 is tapped. Some of this current also passes through the base-emitter junction of the transistor 50. This causes this transistor to conduct and thus connect the battery 58 to the terminal 62. Current from the emitter 72a of the transistor 72 also passes through the base-emitter junction of the transistor 56, thereby providing a conductive path from the terminal 64 to the collector 60c of the transistor 60.

At the same time, the voltage at the collector 72c of the transistor 72 is at a sufficiently low level so that inappreciable current flows through the base-emitter junction of a transistor 80 by way of a resistor 82. The collector 80c of the transistor 80 receives its supply voltage from the battery 58 by way of a voltage divider comprising resistors 84 and 86, with the base 54b of the transistor 54 connected to the junction of these resistors. With the transistor 80 cut off, there is no base-emitter current through the transistor 54, and this transistor is therefore also cut off. Similarly, without significant emitter current in the transistor 80, there is no base-emitter current in the transistor 52, and this transistor is therefore also cut off.

Accordingly, with the situation just described, the current from the battery 58 passes into the winding 20 by way of the terminal 62 and out of the winding by way of the terminal 64.

During the next half cycle of the signal from the generator winding 22, the transistor 48 conducts, thereby dropping the voltage at the base 72b of the transistor 72 and cutting off this transistor. There is now a higher voltage at the collector 72c, thereby providing sufficient base-emitter current in the transistor 80 to turn this transistor on. Since the collector-emitter current path of the transistor 80 is in series with the base-emitter junctions of both the transistors 54 and 52, these latter transistors are also turned on. This connects the battery 58 to the terminal 64 and the terminal 62 to the transistor 60.

At the same time, the reduction in current through the resistor 78 prevents appreciable emitter-base current in the transistor 50, and this transistor is therefore turned off. The transistor 56, whose base-emitter current path is in series with the nonconducting transistor 72 is also cut off.

Accordingly, during this half cycle of generator signal, current from the battery 58 flows into the winding 20 by way of the terminal 64 and out of this winding by way of the terminal 62.

Thus, the amplifier 24 applies a square-wave current to the armature winding 20 in response to the signals from the generator winding 22. The amplitude of this current is sufficient to accelerate the motor 10 (FIG. 1), and thus, each polarity reversal of the signal from the generator winding occurs after a slightly shorter interval than the preceding polarity reversal. This has the effect of continuously increasing the frequency of the output of the amplifier 24, so that the current applied to the armature winding 20 is in synchronism with the increasing speed of the motor.

The transistors 50–56 are saturated when in the conducting state, and therefore, they absorb little power from the battery 58. Thus, the amplifier 24 operates at a relatively high efficiency. A diode 88 between the collector 72c and the resistor 82 prevents backward flow of current during intervals when the base 80b of the transistor 80 is at a higher potential than the collector 72c.

A capacitor 90 is connected between the base 48b and ground to suppress undesirable oscillation in the circuit. Specifically, when there is substantial capacitive coupling between the windings 20 and 22 (FIG. 1) of the motor 10, the loop comprising these windings and the amplifier 24 may oscillate at a high frequency. The capacitor 90 (FIG. 3) sufficiently attenuates any high frequency components at the input of the amplifier 24 to prevent such oscillation.

With further reference to FIG. 3, the speed sensor 26 includes an amplifier comprising a conventionally connected transistor 92 receiving the signal from the generator winding 22. In series between the winding 22 and the base 92b of this transistor are a resistor 94 and a diode 96. The diode 96 serves the same purpose as the diode 68 connected to the transistor 48. The output of the transistor 92, appearing at its collector 92c, is passed through a capacitor 98 and a "sensistor" 100 to the base 102b of a grounded-emitter transistor 102. A pair of tunnel diodes 104 and 106 are connected in series between the base 102b and the ground.

Collector voltage for the transistor 102 is derived from the battery 58 by way of a resistor 108 and a second resistor 110 is connected between the collector 102c and the base 112b of a transistor 112. The transistor 112, which is part of the current controller 28, is a grounded-emitter amplifier connected in cascade with a similarly connected transistor 114 and finally the transistor 60. A capacitor 116 is connected between the collector 102c and ground.

The transistor 102 is not provided with a quiescent-base-emitter current, and therefore, it is normally cut off. Nor do input signals from the generator winding 22 below the threshold of the sensor cause conduction of the transistor 102. At such signal levels, the diodes 104 and 106 present a small resistance compared to the high output resistance of the transistor 92, and therefore, there is insufficient voltage at the base 102b to provide base-emitter conduction in the transistor 102.

However, as is well known, when the current through a tunnel diode is increased beyond a threshold level, the impedance of the diode increases abruptly by a large amount. The transistor 92 operates as a current source for the tunnel diodes, and therefore, when the voltage from the generator 22 reaches a level corresponding to the desired speed of the motor, the current through the diodes is increased beyond the threshold level thereof. The voltage at the base 102b therefore increases to a level providing base-emitter current in the transistor 102, with resulting collector-emitter current in this transistor. This conduction takes place during negative half cycles of the signal from the generator winding 22 and the duration of conduction depends upon such factors as the waveform of the output voltage of the winding 22 and the capacitance of the capacitor 98.

Conduction by the transistor 102 reduces the voltage at the junction of the resistors 108 and 110 and thus reduces the current in the transistor 112. This, in turn, increases the current in the transistor 114, with a resulting decrease in the armature current passing through the transistor 60. The capacitor 116 is an averaging device which evens out the effects of the individual current pulses through the transistor 102.

Thus, as the motor 10 (FIG. 1) comes up to speed, the operation of the tunnel diodes 104 and 106 in the sensor 26 (FIG. 3) causes the transistor 102 to conduct on successive cycles, thereby reducing the voltage across the capacitor 116 and ultimately reducing the armature current through the control exerted by the transistor 60. The reduction in armature current stops the acceleration of the motor which then remains at the desired speed.

Actually, the motor will undergo a very insignificant variation of speed about the operating point, so that the transistor 102 can occasionally discharge the capacitor 116 by an amount corresponding to the charging of this capacitor through the resistor 108.

If the motor speed tends to change, for example, due to a variation in the mechanical load imposed on the motor, the speed sensor 26 and current controller 28 will operate to return the motor substantially to the desired operating speed.

The operating speed of the motor can be adjusted by varying the resistane of an emitter resistor 118 connected to the transistor 92. A change in this resistance changes the gain of the transistor 92 and thus changes the level of the signal from the generator winding 22 corresponding to the threshold current of the diodes 104 and 106. The sensistor 100 is a resistor having a positive temperature coefficient of resistance. It compensates for variations in the threshold current of the diodes 104 and 106 due to temperature changes.

Other means can, of course, be used to sense the speed of the motor 10. For example, a voltage can be developed proportional to the frequency of the signal from a generator winding 22. However, we prefer the amplitude sensing arrangement described above because of its simplicity and compactness.

It should be noted that with a threshold type of speed sensing system, the armature current in the motor remains at full value until the motor reaches operating speed. Thus, acceleration of the motor is more rapid than with a system of the type which provides a control signal continuously proportional to motor speed, i.e., at all speeds including those below the desired operating point.

Thus, we have described a synchronous motor system powered by a source of direct-current. The motor is automatically accelerated to its ultimate speed from a low initial speed and is then held at the desired speed during variations in such factors as the load imposed on the motor. The motor has a simple, single-phase configuration and is provided with a generator winding, similar to the armature winding, which develops a speed-indicating signal. This signal is used by the motor's power supply to accelerate the motor to its operating speed and power it at that speed.

The same signal is used in a speed sensing system, incorporated in a second closed loop arrangement, which maintains the motor at the desired speed.

Both the entire system and the power supply incorporated therein are compact and light in weight, and therefore highly suitable for mobile applications.

It will thus be seen that the objects set forth above, among those made apparent from the preceding description, are efficiently attained and, since certain changes may be made in the above construction without departing

We claim:

1. A synchronous motor system comprising
   (A) a synchronous motor including
      (1) a pair of field magnets,
      (2) an armature winding constructed to carry current interacting with the field provided by said field magnets, and
      (3) a single generator winding for generating a signal indicative of the speed of said motor,
      (4) said field magnets directing an axial magnetic field through said armature and generator windings,
   (B) a power supply including
      (1) an amplifier supplying current to said armature in response to said signal, and
      (2) speed controlling means
         (a) responsive to said signal, and
         (b) controlling the output of said amplifier so as to maintain said motor substantially at a predetermined speed.

2. The combination defined in claim 1 which
   (A) said generator winding in said motor emits an alternating current signal whose frequency is proportional to the speed of said motor, and
   (B) said amplifier provides current to said armature winding in synchronism with said signal.

3. The combination defined in claim 2 in which said speed controlling means includes motor speed sensing means responsive to the amplitude of said signal.

4. The combination defined in claim 3 in which said sensing means responds only to signals exceeding a predetermined amplitude, thereby providing for undiminished output of said amplifier until said motor speed reaches the point corresponding to said predetermined amplitude.

5. A synchronous motor system comprising
   (A) a synchronous motor including
      (1) a pair of field magnets,
      (2) an armature winding arranged to carry a current interacting with the field provided by said magnets so as to cause rotation of said motor,
      (3) a generator winding having substantially the same form as said armature winding and interacting with the field provided by said magnets,
   (B) a square wave generator
      (1) connected to supply current to said armature winding, and
      (2) arranged to reverse the direction of its output current in synchronism with zero axis crossings of the output of said generator winding.

6. A synchronous motor system comprising
   (A) a synchronous motor including
      (1) a pair of field magnets providing a magnetic field,
      (2) an armature winding arranged to carry a current interacting with said field to provide rotation of said motor,
      (3) a generator winding disposed to interact with said magnetic field for generating an alternating current indicative of the speed of said motor,
   (B) an amplifier supplying current to said armature in response to said signal, said amplifier comprising
      (1) first, second, third and fourth semi-conductor switches, each of said switches having a current path which extends through the switch when the switch is closed and is interrupted when the switch is open,
      (2) a source of current having a pair of terminals,
      (3) means connecting said current paths of said first and second switches in series between said current source terminals,
      (4) means connecting said current paths of said third and fourth switches in series between said current source terminals,
      (5) said armature winding having a first terminal connected between said first and second switches and a second terminal connected between said third and fourth switches,
      (6) means closing said first and fourth switches and opening said second and third switches during alternate half cycles of said signal, and closing said second and third switches and opening said first and fourth switches during the other half cycles of said signal, thereby to pass through said armature winding an alternating current having a symmetrical waveform and synchronized to said signal.

7. The combination defined in claim 6 including speed controlling means for said motor, said speed controlling means comprising
   (A) a first transistor having a collector-emitter current path connected in series between said source of current and said first, second, third and fourth switches,
   (B) a generator winding of substanially the same form as said armature winding and having substantially the same relationship to said field, said generator winding providing an alternating current signal indicative of the speed of said motor, and
   (C) means controlling the effective resistance of the collector-emitter current path of said first transistor in response to said alternating current signal so as to maintain said motor at a substantially constant speed.

8. The combination defined in claim 7 in which said controlling means includes
   (A) a second transistor receiving said alternating-current signal,
   (B) a tunnel diode,
   (C) said second transistor passing through said tunnel diode a current responsive to said alternating-current signal,
   (D) switching means responsive to the potential across said tunnel diode and emitting a signal to said first transistor when the current through said tunnel diode exceeds the threshold level thereof.

9. The combination defined in claim 8 including means for averaging the output of said switching means.

10. A power supply for a synchronous motor of the type including an armature winding and means for generating an alternating-current signal indicative of the speed of said motor, said power supply comprising
   (A) first, second, third and fourth semi-conductor switches, each of said switches providing a current path which extends through the switch when the switch is closed and is interrupted when the switch is open,
   (B) a source of unidirectional current having a pair of terminals,
   (C) means connecting said current paths of said first and second switches in series between said current source terminals,
   (D) means connecting said current paths of said third and fourth switches in series between said current source terminals,
   (E) a transistor having a collector-emitter current path in series between said source of current and said first, second, third and fourth switches,
   (F) terminal means for connecting one end of said armature winding between said first and second switches, and the other end of said armature winding between said third and fourth switches, and (G) means closing said first and fourth switches and opening said second and third switches during alternate half cycles of said signal, and closing said second and third switches and opening said first and fourth switches during the other half cycles of said signal, thereby to pass through said armature winding an alternating current having a symmetrical waveform and synchronized with said signal.

11. The combination defined in claim 10 including means controlling the effective resistance of the collector-emitter current path of said transistor in accordance with said alternating-current signal in such manner as to maintain said motor at a substantially constant speed.

12. A power supply for a synchronous motor of the type having an armature winding and a generator winding of substantially the same form as said armature winding, said generator winding having substantially the same relationship to the field of said motor as said armature winding and providing an alternating-current signal indicative of the speed of said motor, said power supply comprising
(A) first, second, third and fourth semi-conductor switches, each of said switches providing a current path which extends through the switch when the switch is closed and is interrupted when the switch is open,
(B) a source of unidirectional current having a pair of terminals,
(C) means connecting said current paths of said first and second switches in series between said current source terminals,
(D) means connecting said current paths of said third and fourth switches in series between said current source terminals,
(E) a first transistor having a collector-emitter current path in series between said source of current and said first, second, third and fourth switches, (F) means closing said first and fourth switches and opening said second and third switches during alternate half cycles of said signal, and closing said second and third switches and opening said first and fourth switches during the other half cycles of said signal, thereby to pass through said armature winding an alternating current synchronized to said signal, and
(G) means for controlling the speed of said motor, said controlling means including
(1) a second transistor receiving said alternating current signal,
(2) a tunnel diode,
(3) said second transistor passing through said tunnel diode a current responsive to said alternating-current signal,
(4) switching means responsive to the potential across said tunnel diode and emitting a signal when the current through said tunnel diode exceeds the threshold level thereof, and
(5) means applying said signal to said first transistor so as to change the effective resistance of the collector-emitter current path thereof.

13. The combination defined in claim 12 including means for averaging the output of said switching means.

References Cited

UNITED STATES PATENTS

| | | | |
|---|---|---|---|
| 3,025,443 | 3/1962 | Wilkinson et al. | 318—138 |
| 3,050,671 | 8/1962 | Moller | 318—138 XR |
| 3,171,075 | 2/1965 | Kirk | 318—254 XR |
| 3,242,406 | 3/1966 | Tanaka | 318—138 |
| 3,290,573 | 12/1966 | Kamens | 318—171 |

ORIS L. RADER, *Primary Examiner.*

G. Z. RUBINSON, *Assistant Examiner.*